(12) United States Patent
Kobayashi

(10) Patent No.: US 9,732,785 B2
(45) Date of Patent: Aug. 15, 2017

(54) SUCTION CUP DEVICE

(71) Applicant: KAI R&D CENTER CO., LTD., Gifu (JP)

(72) Inventor: Fumio Kobayashi, Gifu (JP)

(73) Assignee: KAI R & D CENTER CO., LTD., Gifu (JP)

( * ) Notice: Subject to any disclaimer, the term of this patent is extended or adjusted under 35 U.S.C. 154(b) by 0 days.

(21) Appl. No.: 14/862,690

(22) Filed: Sep. 23, 2015

(65) Prior Publication Data

US 2017/0023051 A1    Jan. 26, 2017

(30) Foreign Application Priority Data

Sep. 25, 2014 (JP) ................... 2014-195803

(51) Int. Cl.
| | |
|---|---|
| *F16B 47/00* | (2006.01) |
| *A47K 10/18* | (2006.01) |
| *A47L 19/00* | (2006.01) |
| *A45D 42/14* | (2006.01) |
| *F16M 13/02* | (2006.01) |

(52) U.S. Cl.
CPC ............ *F16B 47/006* (2013.01); *A45D 42/14* (2013.01); *A47K 10/18* (2013.01); *A47L 19/00* (2013.01); *F16B 47/00* (2013.01); *F16M 13/022* (2013.01)

(58) Field of Classification Search
CPC .......... A47K 5/02; F16M 13/02; F16B 47/00; A45D 20/12; A45D 2020/126; A45D 42/14; A47B 96/02; A47B 96/061; B60R 2011/0056; B60R 2011/0026

USPC ......... 248/205.5, 206.2, 206.3, 205.6, 205.8, 248/206.4, 205.7, 362, 363, 467, 537
See application file for complete search history.

(56) References Cited

U.S. PATENT DOCUMENTS

| | | | | |
|---|---|---|---|---|
| 5,970,860 A | * | 10/1999 | Yip | A47J 43/07 241/169.1 |
| 6,422,402 B1 | * | 7/2002 | Hollinger | A47G 21/16 211/13.1 |
| 6,666,420 B1 | * | 12/2003 | Carnevali | F16B 47/00 248/205.8 |

(Continued)

FOREIGN PATENT DOCUMENTS

| | | |
|---|---|---|
| JP | 2009-092107 | 4/2009 |
| JP | 2013-217475 | 10/2013 |

*Primary Examiner* — Nkeisha Smith
(74) *Attorney, Agent, or Firm* — Jordan and Koda, PLLC

(57) ABSTRACT

Provided is a suction cup device with which the work of attaching the suction cup to the attachment surface, and the work of releasing the attachment can be performed quickly, and with which a fixture member comprised by a fixture that is equipped with a suction cup device can be arranged on the top face of the suction cup device. The suction cup device comprises an operation member capable of reciprocating movement in a direction that intersects with a suction cup support shaft, and a means for applying pulling force to the suction cup support shaft as a result of the movement of the operation member in a predetermined direction. Preferably, the suction cup device comprises an operation member capable of reciprocating sliding movement in a direction that intersects with a suction cup support shaft, and a means for applying pulling force to the suction cup support shaft as a result of the sliding movement of the operation member in a predetermined direction.

6 Claims, 11 Drawing Sheets

(56) References Cited

U.S. PATENT DOCUMENTS

| | | | | |
|---|---|---|---|---|
| 7,469,868 | B2* | 12/2008 | Bury | F16B 47/00 |
| | | | | 248/205.8 |
| 7,815,155 | B2* | 10/2010 | Hung | F16B 47/00 |
| | | | | 248/205.5 |
| 7,850,133 | B2* | 12/2010 | Carnevali | F16B 47/00 |
| | | | | 248/205.5 |
| 9,200,667 | B1* | 12/2015 | Hsu | F16B 47/00 |
| 2009/0294609 | A1* | 12/2009 | Riddiford | B60R 11/02 |
| | | | | 248/206.2 |
| 2010/0252700 | A1* | 10/2010 | Wang | F16B 47/00 |
| | | | | 248/206.2 |
| 2013/0075553 | A1* | 3/2013 | Rautiainen | F16M 13/00 |
| | | | | 248/205.8 |

* cited by examiner

SUCTION CUP DEVICE

BACKGROUND OF THE INVENTION

The present invention relates to a suction cup device comprised by a fixture that is used, primarily in ordinary households, fastened by way of suction attachment on top of sink cabinets and on bathroom walls.

Most conventional suction cups have a configuration wherein a suction cup support shaft is provided upright in the center of the top face of the suction cup, and pulling force is applied to the suction cup support shaft by way of operating an operation member. Various different configurations have been proposed but in terms of the operation member itself, these can be broadly divided into those of the lever type and those of the screw type. Those of the lever type are configured with the lever pivotably attached so as to be able to turn at the top of the suction support shaft, and pulling force is applied to the suction cup support shaft by turning the lever. Furthermore, with those of the screw type, a male thread is cut into the suction cup support shaft, a female thread is cut into the operation member, and the operation member is screwed onto the suction cup support shaft. Then, the configuration is normally such that pulling force is applied to the suction cup support shaft by rotating the operation member clockwise.

With lever type suction cup devices, turning the lever forward or backward by 90° suffices for attachment, and therefore the work can be performed quickly. Accordingly, this has the advantage of convenience when it is necessary to change the mounting of the suction cup device frequently. However, because the base of the lever is pivotably attached to the suction cup support shaft that is provided upright in the center of the top face of the suction cup, the position in which the lever is attached is the approximate center of the top face of the suction cup, and the lever will turn around this attachment position. Consequently, there are limits on the use of the top face of lever type suction cup device, due to the presence of the lever, and thus fixture members comprised by fixtures equipped with a suction cup device, such as hanging hooks, for example, can only be provided on the peripheral faces of the suction cup device.

Meanwhile, with screw type suction cup devices, the peripheral face of operation member, which is the screw fastener, is gripped by the fingers from the side of the screw fastener and the operation member is rotated, and therefore the use of the top face of the suction device is not limited, and hanging hooks and the like can be provided on the top face of the suction cup device. However, because the suction cup support shaft is pulled by way of rotating the operation member, which is the screw fastener, the pitch of the thread must be small in order to produce a large force, and therefore it is necessary to turn the operation member many times in order to fully attach the suction cup. Consequently, considerable time is required to complete the attachment work. If the mounting of the fixture will not be changed once it has been attached, for example, such as in the case of a bathroom shower mount, even if considerable time is required for the attachment work, this will not be seen as a particular inconvenience. However, if this is used for fixtures that are attached in different places each time that they are used, and therefore the mounting of suction cup device must be frequently changed, it is inconvenient to spend time and effort each time that the mounting work is performed.

PRIOR ART DOCUMENTS

Patent Document 1 JP-2013-217475-A
Patent Document 2 JP-2009-092107-A

SUMMARY OF THE INVENTION

An object of the present invention is to provide a suction cup device with which the work of attaching the suction cup to the attachment surface, and the work of releasing the attachment can be performed quickly, and with which a fixture member comprised by a fixture that is equipped with a suction cup device can be arranged on the top face of the suction cup device.

The configuration of the invention is such that, in a suction cup device including a suction cup and a suction cup support shaft provided upright in the center of the top face of the suction cup, wherein the suction cup is attached to an attachment surface by applying a pulling force to the suction cup support shaft, the suction cup device comprises: an operation member capable of reciprocating movement in a direction that intersects with the suction cup support shaft; and a means for applying pulling force to the suction cup support shaft as a result of the movement of the operation member in a predetermined direction.

The configuration of the invention is such that the suction cup device comprises: an operation member capable of reciprocating sliding movement in a direction that intersects with the suction cup support shaft; and a means for applying pulling force to the suction cup support shaft as a result of the sliding movement of the operation member in a predetermined direction.

The configuration of the invention is such that the means for applying pulling force to the suction cup support shaft as a result of the movement of the operation member in a predetermined direction is a cam mechanism that converts the movement of the operation member into a suction cup support shaft pulling motion.

The configuration of the invention is such that pulling force is applied to the suction cup support shaft by: forming an inclined face on a top face of the operation member, which extends in the direction of movement of the operation member; providing an engagement part on the suction cup support shaft, which engages with the inclined face; and pushing the engagement part up as the inclined face moves in conjunction with the movement of the operation member.

The configuration of the invention is such that pulling force is applied to the suction cup support shaft by: providing an insertion hole in the operation member that allows the suction cup support shaft to be inserted through the operation member so that the top of suction cup support shaft protrudes above the operation member, wherein the insertion hole extends in the direction in which the operation member is able to move, so that the operation member is able to move with respect to the suction cup support shaft; providing a through hole at the top of the suction cup support shaft, which passes therethrough in a direction orthogonal to the central axis thereof; inserting a support pin into the through hole, with the suction cup support shaft inserted through the insertion hole; engaging a portion of the support pin that protrudes from the through hole on the inclined face of the operation member, so as to serve as said engagement part; and pushing the engagement part up as the inclined face moves in conjunction with the movement of the operation member.

The configuration of the invention is such that the operation member is mounted in a housing, and a pair of holes are formed in a peripheral wall of the housing through which the two ends of the operation member can protrude.

The configuration of the invention is such that the amount by which the two ends of the operation member protrude, with respect to the surface of the peripheral wall of the housing, in the state in which the suction cup is attached to the attachment surface, is no greater than 5 mm each.

The configuration of the invention is such that, in the state in which the suction cup is attached to the attachment surface, the amount by which a first end of the operation member protrudes is zero or negative and the amount by which a second end of the operation member protrudes is no greater than 5 mm, wherein the second end is the end of the operation member that is pressed in order to release the pulling force than is applied to the suction cup support shaft by pushing and moving the operation member.

The configuration of the invention is such that, in a suction cup device including a suction cup and a suction cup support shaft provided upright in the center of the top face of the suction cup, wherein the suction cup is attached to an attachment surface by applying a pulling force to the suction cup support shaft, the suction cup device comprising: an operation member; and a means for applying pulling force to the suction cup support shaft as a result of the movement of the operation member in a predetermined direction, wherein the operation member does not protrude beyond the highest point on the housing, even when the suction cup is attached to an attachment surface, or even when performing operations to attach the suction cup to, or detach the suction cup from, the attachment surface.

In the invention, the operation member is capable of reciprocating movement in a direction that intersects with the suction cup support shaft, and a means is provided for applying pulling force to the suction cup support shaft as a result of the movement of the operation member in a predetermined direction. Accordingly, a fixture member can be arranged on top face of the suction cup device, regardless of the presence of the operation member, and thus this can be used for a wide variety of fixtures equipped with suction cup devices. Furthermore, because pulling force can be applied to the suction cup support shaft as a result of the movement of the operation member, which is capable of reciprocating movement, in a predetermined direction, the suction cup can be attached to the attachment surface quickly.

The invention is such that the suction cup device comprises: an operation member capable of reciprocating sliding movement in a direction that intersects with the suction cup support shaft; and a means for applying pulling force to the suction cup support shaft as a result of the sliding movement of the operation member in a predetermined direction. Accordingly, because the movement of the operation member is sliding movement, the operation can be performed smoothly.

The invention is such that the means for applying pulling force to the suction cup support shaft as a result of the movement of the operation member in a predetermined direction is a cam mechanism that converts the movement of the operation member into a suction cup support shaft pulling motion. Because the cam mechanism is a mechanism that allows the transmission of a motion to be performed smoothly, the operation member does not shudder during movement, and the operation member can be moved smoothly.

The configuration of the invention is such that pulling force is applied to the suction cup support shaft by: forming an inclined face on a top face of the operation member, which extends in the direction of movement of the operation member; providing an engagement part on the suction cup support shaft, which engages with the inclined face; and pushing the engagement part up as the inclined face moves in conjunction with the movement of the operation member. In order for the suction cup device to be reliably attached, it is necessary to produce a vacuum state between the suction cup and the attachment surface by pulling up the suction cup support shaft, and a large force is necessary for this. With the present invention, the inclined face of the operation member is used, and some of the force in the direction of movement of the operation member is converted to force that pulls up the suction cup support shaft, so that the suction cup support shaft is gradually pulled up, whereby the suction cup support shaft can be pulled up with a relatively small force.

The invention is such that pulling force is applied to the suction cup support shaft by: providing an insertion hole in the operation member that allows the suction cup support shaft to be inserted through the operation member so that the top of the suction cup support shaft protrudes above the operation member, wherein the insertion hole extends in the direction in which the operation member is able to move, so that the operation member is able to move with respect to the suction cup support shaft; providing a through hole in the top of the suction cup support shaft, which passes therethrough in a direction orthogonal to the central axis thereof; inserting a support pin into the through hole, with the suction cup support shaft inserted through the insertion hole; engaging a portion of the support pin that protrudes from the through hole on the inclined face of the operation member, so as to serve as said engagement part; and pushing the engagement part up as the inclined face moves in conjunction with the movement of the operation member. Accordingly, the engagement part that engages with the inclined face is a portion of the support pin that protrudes from the through hole, and thus the contact area between the inclined face and the engagement part is minimal. Consequently, it is possible to minimize the frictional force between the inclined face and the engagement part, which is generated when the operation member is moved, allowing the operation member to be moved easily.

The invention is such that the operation member is mounted in a housing, and a pair of holes are formed in a peripheral wall of the housing through which the two ends of the operation member can protrude. Accordingly, in order to move the operation member, an end of the operation member is pushed with a fingertip, and when the operation member reaches a predetermined position, the fingertip strikes the surface of the peripheral wall of the housing, which makes it possible to prevent excessive pressing of the operation member.

The invention is such that in the state in which the suction cup is attached to the attachment surface, the amount by which the two ends of the operation member protrude, with respect to the surface of the peripheral wall of the housing, is no greater than 5 mm each. Accordingly, if an end of the operation member protrudes from the surface of the peripheral wall of the housing, it will only protrude slightly, and thus will not hinder the use of the suction cup device.

The invention is such that in the state in which the suction cup is attached to the attachment surface, the amount by which a first end of the operation member protrudes is zero or negative and the amount by which a second end of the operation member protrudes is no greater than 5 mm, wherein the second end is the end of the operation member that is pressed in order to release the pulling force that is applied to the suction cup support shaft by pushing and moving the operation member. Accordingly, one end of the operation member will not protrude when the suction cup device is in the attached state, which improves the appearance of the suction cup device.

The invention is such that in a suction cup device including a suction cup and a suction cup support shaft provided upright in the center of the top face of the suction cup, wherein the suction cup is attached to an attachment surface by applying a pulling force to the suction cup support shaft, the suction cup device comprising: an operation member; and a means for applying pulling force to the suction cup support shaft as a result of the movement of the operation member in a predetermined direction, wherein the operation member does not protrude beyond the highest point on the housing, even when the suction cup is attached to an attachment surface, and even when performing operations to attach the suction cup to, or detach the suction cup from, the attachment surface. Accordingly, a broad area on the top face of the suction cup device can be used, in order to achieve the purpose of the fixture.

DESCRIPTION OF THE PREFERRED EMBODIMENTS

Figure 1:
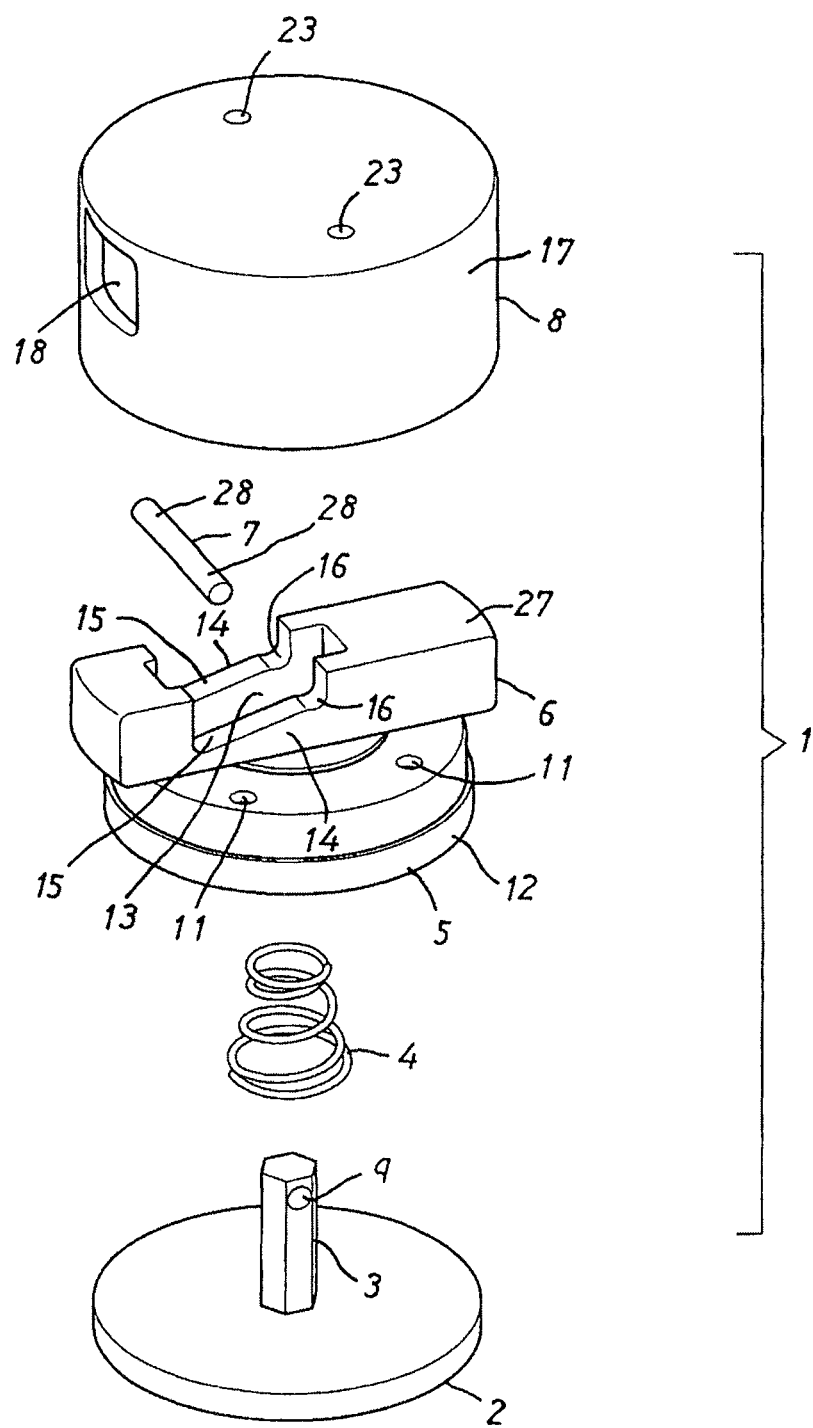
FIG. 1 is an exploded perspective view of the first embodiment of the present invention.

A first embodiment of the present invention will be described hereafter referring to FIG. 1 through FIG. 6. As shown in FIG. 1, the suction cup device 1 in the first embodiment comprises: a suction cup 2; a sectionally hexagonal suction cup support shaft 3, which is provided upright in the center of the suction cup 2; a coil spring 4; a suction cup receptacle 5; an operation member 6; a support pin 7; and a housing 8. The suction cup 2 serves to attach the suction cup device 1 to an attachment surface, and the suction cup support shaft 3 is formed integrally with this suction cup 2. Furthermore, a through hole 9 is provided at the top of the suction cup support shaft 3, which passes through the suction cup support shaft 3, orthogonal to the central axis thereof.

Figure 3:
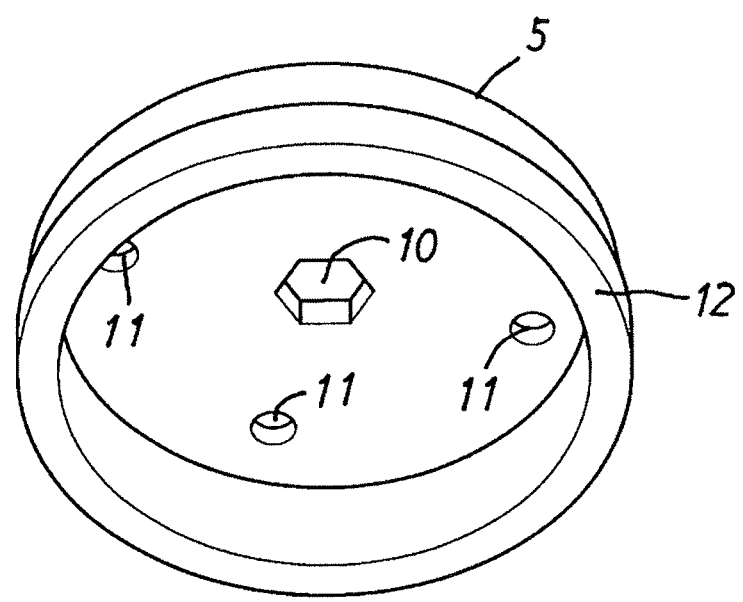
FIG. 3 is a perspective view, seen from below, of the suction cup receptacle in the first embodiment.
Figure 4:
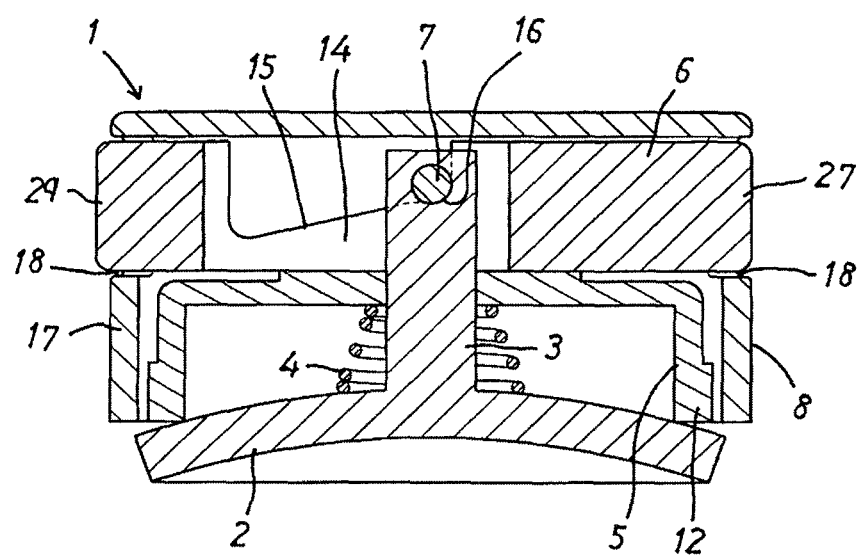
FIG. 4 is a sectional view, in which the screw-hole post and the fastening post have been omitted, showing the situation when sufficient pulling force is produced on the suction cup support shaft in the first embodiment.

As shown in FIG. 4, the suction cup receptacle 5 serves to receive the deformed suction cup 2 within the peripheral wall 12 of the suction cup receptacle 5, and is formed from a hard material such as a hard plastic. Note that, the screw-hole post 19 and the fastening post 21, which are provided on the top inner face of the housing 8, have been omitted from the sectional view in FIG. 4. Furthermore, as shown in FIG. 3, a hexagonal shaft hole 10 is formed in the center the suction cup receptacle 5, and four screw insertion holes 11 (one of which is not shown in the drawing) are formed around this.

The operation member 6 is made from a hard material such as a hard plastic, and by moving the operation member 6 in the longitudinal direction thereof, pulling force is applied to the suction cup support shaft 3, or the pulling force is released. Furthermore, an insertion hole 13 is provided in the operation member 6 for inserting the suction cup support shaft 3 through the operation member 6 so that the top of the suction cup support shaft 3 protrudes above the operation member 6. The insertion hole 13 is elongate, and extends in the longitudinal direction of the operation member 6 as seen from above. Inclined faces 15, which are inclined in the longitudinal direction, are formed on the top faces of side walls 14 on the two sides of the insertion hole 13. A pair of engagement parts 28 on a support pin 7, which is inserted through a through hole 9 in the suction cup support shaft 3, protrude from this through hole 9 and engage on the inclined faces 15. Furthermore, latching recesses 16 are formed at the upper ends of the inclined faces 15. These latching recesses 16 serve to receive the two engagement parts 28 of the support pin 7, so that the support pin 7 is latched.

Figure 2:
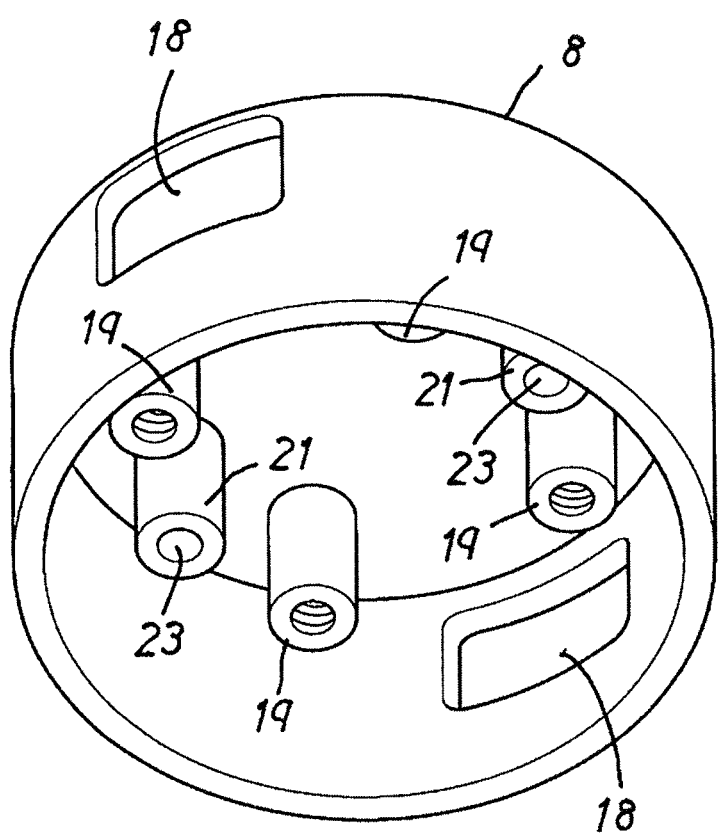
FIG. 2 is a perspective view, seen from below, of the housing in the first embodiment.

As shown in FIG. 2, a pair of holes 18 are formed in the peripheral wall 17 of the housing 8, so that the two ends of the operation member 6 can protrude therefrom. Being able to protrude therefrom means that they are of a size that allows the ends of the operation member 6 to protrude, and whether or not the ends actually protrude is not an issue. Furthermore, four screw-hole posts 19 and a pair of fastening posts 21, serving to fasten a fixture member 20 comprised by a fixture that is equipped with the suction cup device 1, are formed at the top inner face of the housing 8. Placement holes 23, for inserting the two legs 22 of the fixture member 20, pass through these fastening post 21 in the longitudinal direction thereof, and as shown in FIG. 1, these placement holes 23 pass through to the top face of the housing 8.

Figure 5:
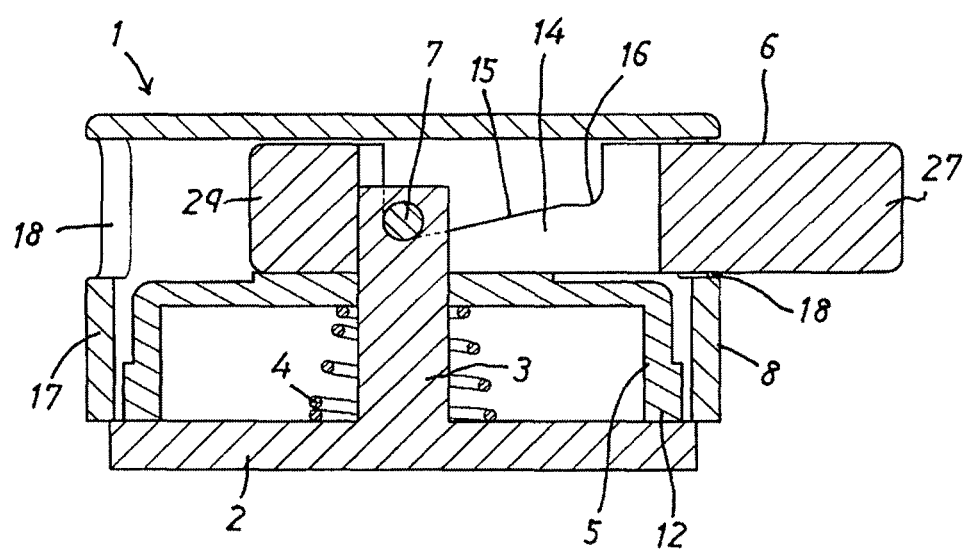
FIG. 5 is a sectional view, in which the screw-hole post and the fastening post have been omitted, showing the situation when almost no pulling force is produced on the suction cup support shaft in the first embodiment.

Next, the assembly of the first embodiment is described. First, a coil spring 4 is mounted on the suction cup support shaft 3. Next, the suction cup support shaft 3 is inserted into the shaft hole 10 in the suction cup receptacle 5, from the bottom. Next, the operation member 6 is placed on the top face the suction cup receptacle 5, and the suction cup support shaft 3, which protrudes from the shaft hole 10 in the suction cup receptacle 5 is inserted through the insertion hole 13 in the operation member 6. Next, the support pin 7 is inserted in the through hole 9 in the suction cup support shaft 3, which is protruding from the insertion hole 13. The result of assembly in this manner is the internal mechanism that can be seen in FIG. 5, without the housing 8 shown in FIG. 5. Next, a first end 27 of the operation member 6, which is protruding in the internal mechanism shown in FIG. 5, is pushed so as to move the operation member 6 slightly to the left, and slightly reduce the amount by which this first end 27 protrudes. Next, with the operation member 6 slightly inclined, the tip of that end 27 is inserted into one of the holes 18 in the housing 8, from the bottom of the housing 8, and the internal mechanism is turned until the tip of the end 27 protrudes from the hole 18. Thus, the internal mechanism is fully received within the housing 8. Next, the housing 8 that has received the internal mechanism is turned upside down, the suction cup 2 is turned up so as to expose the screw insertion holes 11 in the suction cup receptacle 5, and screws (not shown) are inserted and screwed into the screw-hole posts 19 on the housing 8, via these holes 11. Assembly of the suction cup device 1 is completed by screwing in four screws (not shown).

Figure 6:
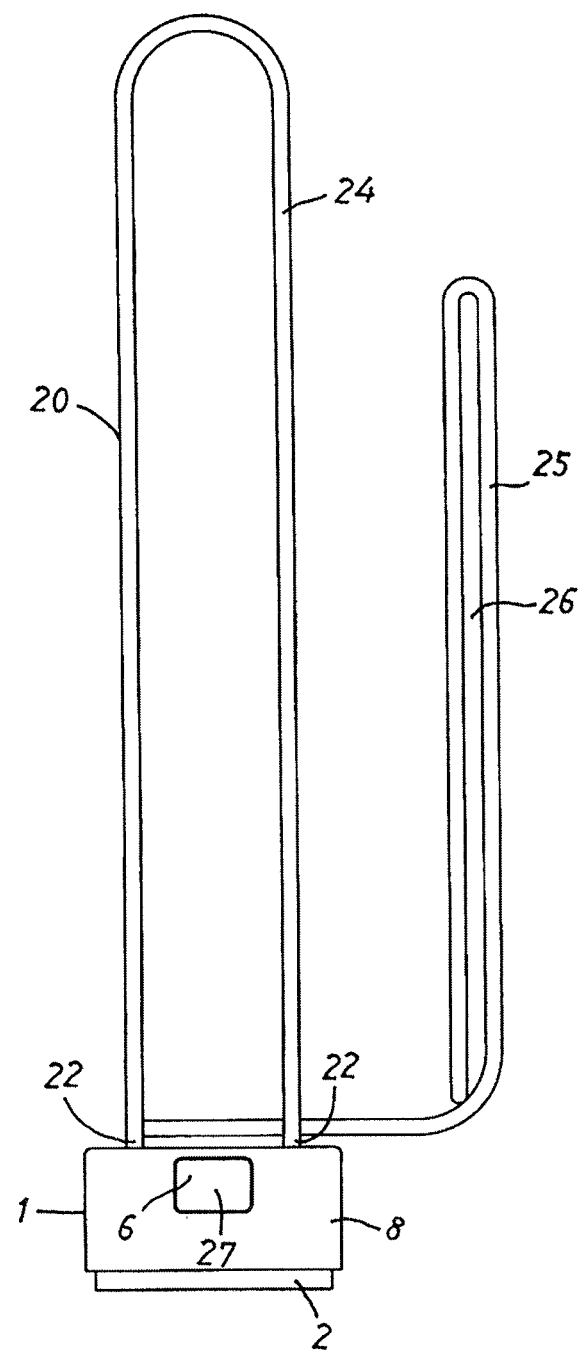
FIG. 6 is a front view of the first embodiment, serving as a suction cup device for a paper towel stand.

If this suction cup device 1 is used for a paper towel stand as shown in FIG. 6, one end 27 of the operation member 6 is first made to fully protrude as shown in FIG. 5. At this time, the support pin 7 is at the lowest position on the inclined faces 15, and therefore no pulling force is generated on the suction cup support shaft 3, or at most very little pulling force is generated. Next, the suction cup 2 is placed on an attachment surface and the end 27 of the operation member 6 is pressed so that the operation member 6 is moved to the left in FIG. 5. In conjunction with the movement of the operation member 6, the inclined faces 15 push the support pin 7 upward, applying pulling force to the suction cup support shaft 3. As shown in FIG. 4, when the end 27 of the operation member 6 is fully pushed in, the suction cup 2 flexes, and a vacuum is produced between the suction cup 2 and the attachment surface, attaching the suction cup device 1 to the attachment surface. Because the latching recesses 16 are formed at the highest position on the inclined faces 15, the operation member 16 is fixed in place at this position. Thus, with the present invention, the suction cup device 1 can be attached to the attachment surface quickly, simply by moving the operation member 6 in one direction. Note that, before fastening the suction cup device 1 to the attachment surface by way of suction, the legs 22 of the fixture member 20, which is made from wire, were inserted into the placement holes 23 in the top face of the housing 8, and fastened in the fastening posts 21, in advance. The configuration may also be such that, instead of this, the fixture member 20 is fastened on the suction cup device 1 after fastening the suction cup device 1 on the attachment surface by way of suction. The fixture in the first embodiment, which is shown in FIG. 6, is a paper towel stand, which is used by inserting a support part 24 into the cylindrical cavity at the center of a roll of paper towels, so as to stand the paper towels upright thereon, inserting a paper towel pulled from the roll into a slit 26 in a retaining part 25, and pulling out the required amount of paper towel through the slit 26.

Next, the method of releasing the attached state of the suction cup 2 shown in FIG. 4 will be described. A second end 29 of the operation member 6 protrudes slightly from the hole 18 in the housing 8, and by pushing this end 29 into the housing 8 with the tip of a finger, the operation member 6 is moved slightly to the right. Thereupon, the support pin 7 that is engaged in the latching recesses 16 on the operation member 6 comes out of the latching recesses 16, and the first end 27 of the operation member 6 protrudes from the housing 8. Then, if this end 27 is gripped with the fingertips and pulled, the support pin 7 moves downward on the inclined faces 15, and the operation member 6 can be moved to the position shown in FIG. 5 with minimal force. Because it is possible to move the operation member 6 with minimal force with the fingertips, in this manner, even if the second end 29 of the operation member 6 only protrudes very slightly from the housing 8 such that, when this end 29 is pushed into the housing the other end 27 protrudes by less than 10 mm, the operation member 6 can be moved by gripping that end 27. When the operation member 6 moves to the position in FIG. 5, the attached state is released. Thus, with the present invention, the attached state can be released quickly, simply by moving the operation member 6 in one direction.

Next, the sizes in the first embodiment will be described. The diameter of the housing 8 is approximately 64 mm, and the height is approximately 32 mm. The thickness of the suction cup 2 is approximately 5 mm. Furthermore, the length of the operation member 6 is approximately 66 mm, the height is approximately 13 mm, and the width is approximately 18 mm. Accordingly, in FIG. 4, the amount by which the first end 27 of the operation member 6 protrudes is zero, and therefore the amount by which the second end 29 protrudes is approximately 2 mm. Thus, when attached, the second end 29 of the operation member 6 protrudes by only approximately a 2 mm, which is visually attractive. Note that it is a matter of course that the present invention is not limited by the numerical values described above.

Next, a second embodiment of the present invention will be described with reference to FIG. 7 to FIG. 11. As in the first embodiment, the suction cup device 30 in the second embodiment comprises a suction cup 31, a suction cup support shaft 32 having a sectionally hexagonal through hole 64, an operation member 33, a support pin 34 and a housing 35, wherein the operation member 33 having inclined faces 36 is moved so as to pull up the support pin 34 and apply pulling force to the suction cup support shaft 32, so as to attach the suction cup 31 to the attachment surface; and because this basic configuration is the same as in the first embodiment, description thereof will be omitted.

Figure 10:
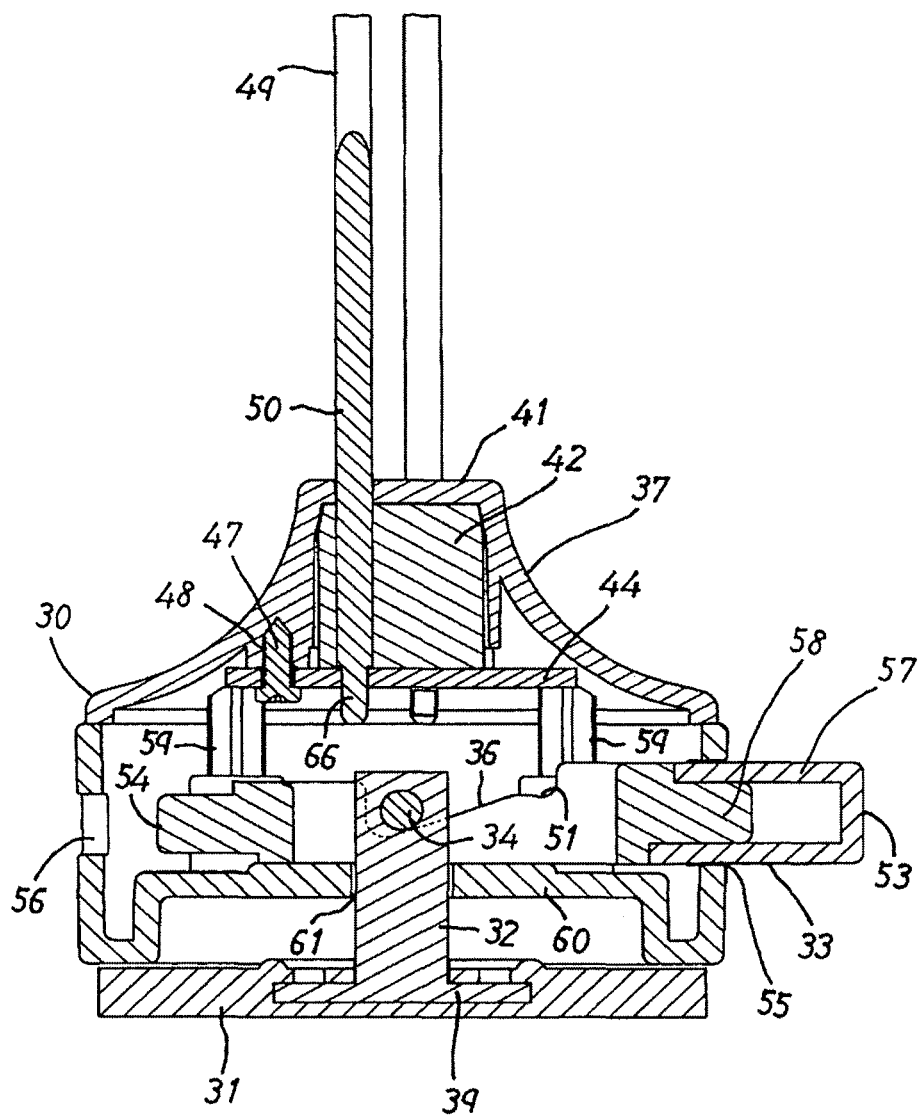
FIG. 10 is a sectional view showing the situation in which there is almost no pulling force is produced on the suction cup support shaft of the second embodiment.

One difference between the second embodiment and the first embodiment is that the second embodiment does not have the suction cup receptacle 5 that the first embodiment has, but rather the housing 35 in the second embodiment also serves as a suction cup receptacle. Furthermore, the second embodiment also does not have the coil spring 4 of the first embodiment. If the suction cup 31 is configured so as to produce a strong elastic force, when not attached, the suction cup 31 will return to its original state automatically by way of its own elastic force, even if a coil spring is not provided. The top face portion and the peripheral walls 17 of the housing 8 in the first embodiment are integrally formed, but in the housing 35 of the second embodiment, a cover 37 corresponding to the top face and a housing body 38 are formed separately. It is a matter of course that the cylindrical portion of this housing body 38 corresponds to the peripheral wall. The idea is, therefore, that the housing 35 includes the housing body 38 and the cover 37. Furthermore, in the first embodiment, the suction cup 2 and the suction cup support shaft 3 were integrally formed, but as shown in FIG. 10, in the second embodiment, the suction cup 31 and the suction cup support shaft 32 are formed separately and configured so that a base 39 of the suction cup support shaft 32 is embedded in the center of the suction cup 31.

Figure 7:
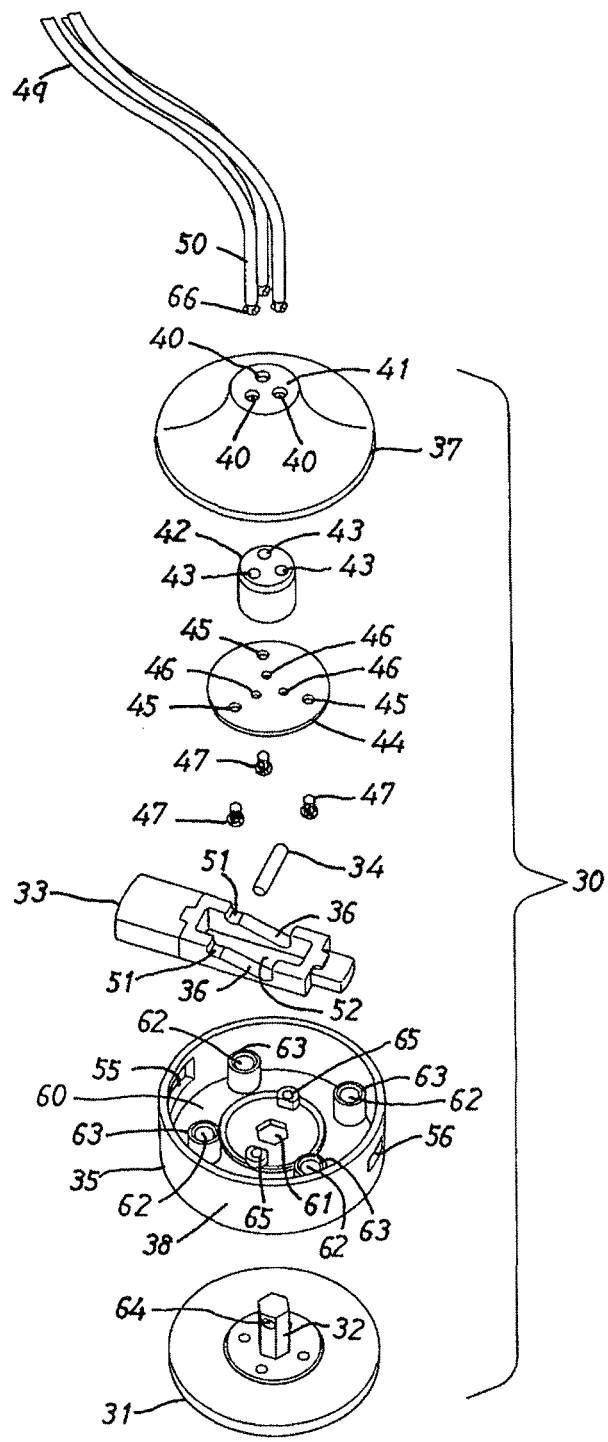
FIG. 7 is an exploded perspective view of the second embodiment, serving as a suction cup device for a plastic bottle drying rack.
Figure 9:
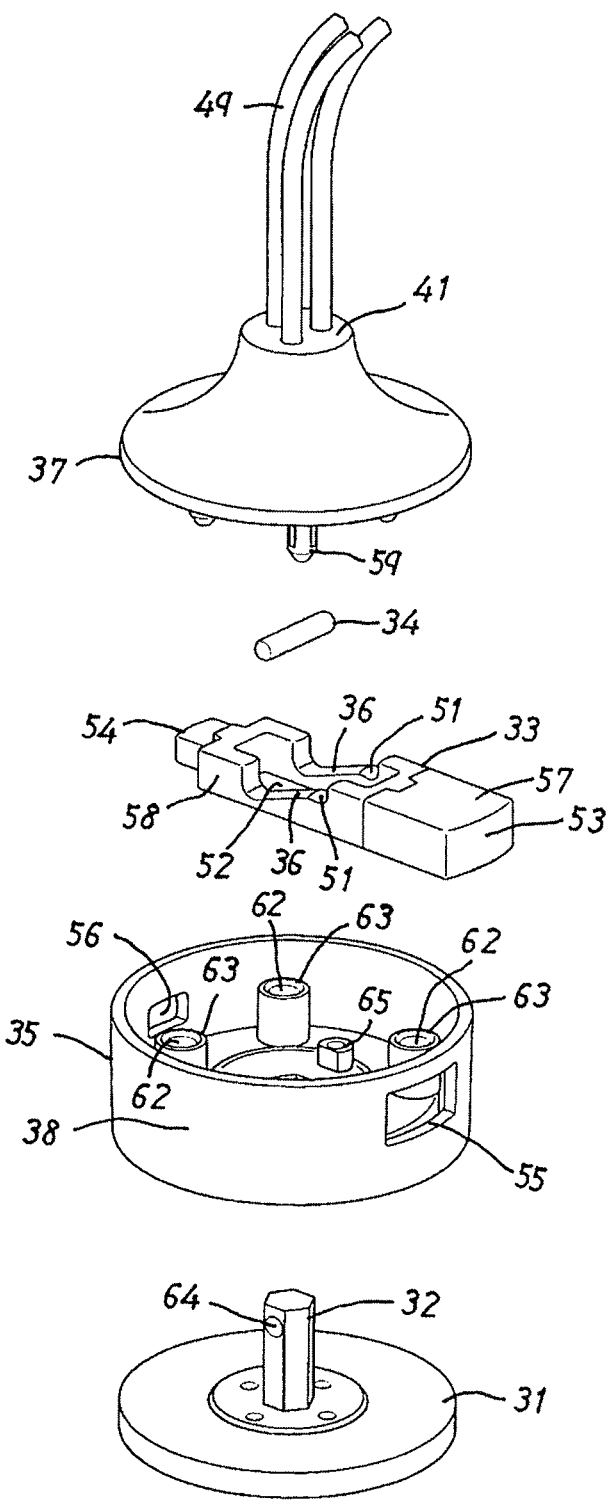
FIG. 9 is a perspective view, seen from above, of key components of the second embodiment, in the disassembled state.

First, the configuration of the cover 37 in the second embodiment will be described. As shown in FIG. 9, the cover 37 has a flat topped cone shape, and is hollow at the interior; as shown in FIG. 7, three placement holes 40 are formed in the top face 41. Furthermore, as shown in FIG. 10, a cylindrical member 42 is fitted below the top face 41, at the inner face of the cover 37; and as shown in FIG. 7, three insertion holes 43 are formed in this cylindrical member 42.

The positions of the three insertion holes 43 in the fitted cylindrical member 42 and the three placement holes 40 in the cover 37 coincide, and the inner diameters thereof are also the same. As shown in FIG. 10, a retention plate 44 is fitted within the cover 37 so as to prevent the cylindrical member 42 from coming out of the cover 37. As shown in FIG. 7, this retention plate 44 is provided with three screw insertion holes 45, near the outer periphery, and three locking holes 46 inward thereof. The retaining plate 44 is placed on the bottom of the cylindrical member 42 within the cover 37, and by inserting three screws 47 into the screw insertion holes 45 and screwing them into the screw holes 48, the retaining plate 44 is fastened in the cover 37. The positions of the three locking holes 46 coincide with those of the three insertion holes 43 in the cylindrical member 42 but the inner diameter of the locking holes 46 is smaller than that of the insertion holes 43. Legs 50 of a fixture member 49, which is made from wire and serves to dry inverted plastic bottles, are inserted into the placement holes 40 in the top face 41, the insertion holes 43 in the cylindrical member 42 and the locking holes 46 in the retention plate 44. The bottoms 66 of the legs 50 are formed so as to be narrow, and protrusions are formed there on, so that when the bottoms 66 are inserted into the locking holes 46, these protrusions latch in the retaining plate 44, so as to support the fixture member 49. Further, as shown in FIG. 8, four fitting legs 59 are provided extending downward from the inner face of the cover 37.

As shown in FIG. 9, in the same manner as in the first embodiment, inclined faces 36 are formed on the operation member 33, latching recesses 51 are formed at the highest ends of these inclined faces 36, and an elongate insertion hole 52 is formed in the longitudinal direction. These features serve the same purposes as in the first embodiment. However, the thickness and width of a second end 54, are less than the thickness and width of a first end 53. Corresponding to this, the height and width of a second hole 55 in the housing 53 are less than those of a first hole 56. Furthermore, as shown in FIG. 10, the operation member 33 results from assembling two parts 57 and 58. The first part 57 is thick, and therefore this part 57 is hollow at the interior, so as to avoid forming a depression known as shrink mark on the surface, which is caused by contraction of thick portions during molding.

Figure 8:
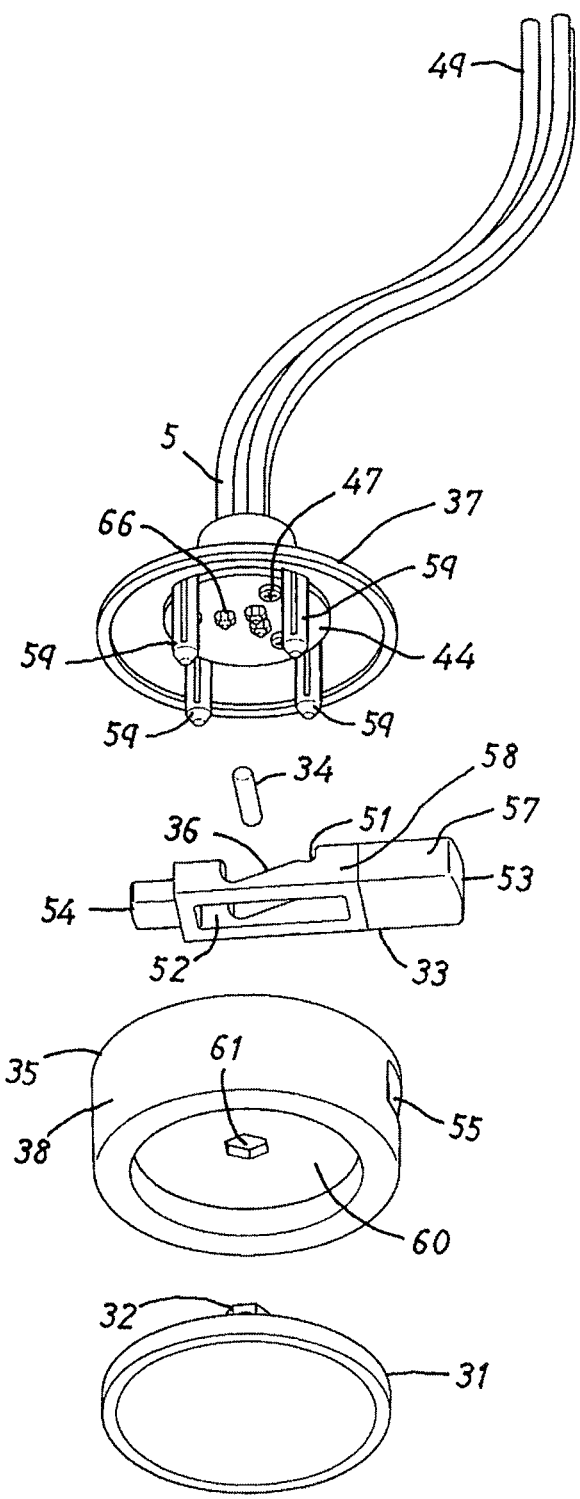
FIG. 8 is a perspective view, seen from below, of key components of the second embodiment, in the disassembled state.

As shown in FIG. 8, the housing body 38 has a bottom 60, and a hexagonal shaft hole 61 is formed in the center thereof. Furthermore, as shown in FIG. 7, four fastening posts 63, each having a fastening hole 62, are formed on the bottom 60. The housing 35 is assembled by fitting the four fitting legs 59 on the cover 37 into these fastening holes 62. Furthermore, a pair of guides 65 are formed on the 2 sides of the shaft hole 61 in the housing 35. These guide 65 are provided so that when the operation member 33 slides, the operation member 33 will pass between these two guide 65, which prevents lateral shaking when the operation member 33 moves.

Next, the assembly of the second embodiment is described. Note that the cover 37, which was described above, is assembled as shown in FIG. 8 and FIG. 9. Here, the small end 54 of the operation member 33 is first inserted into the larger hole 55 in the housing 35, and the operation member 33 is moved until it reaches the position shown in FIG. 10. Next, the suction cup support shaft 32 is inserted into the shaft hole 61 in the housing 35 from below, and this suction cup support shaft 32 is inserted through the insertion hole 52 in the operation member 33. Next, the support pin 43 is inserted into the through hole 64 that is exposed by the insertion hole 52. Then, the aforementioned fitting legs 59 of the cover 37 are fitted into the fastening posts 63, so as to assemble the suction cup device 30. Note that the reason for which the end 54 of the operation member 33 is small is that, when the suction cup device 30 is not being used, the small hole 56 in the housing 35 that receives this is open as shown in FIG. 10, such that dirt or dust may get in, and the hole 56 has been made small so as to make this less likely to occur. Furthermore, in terms of appearance as well, a smaller hole 56 offers a better presentation. Further, by virtue of the difference in the size of the two ends 53, 54, it is easy to recognize which is the attachment end and which is the release end.

Figure 11:
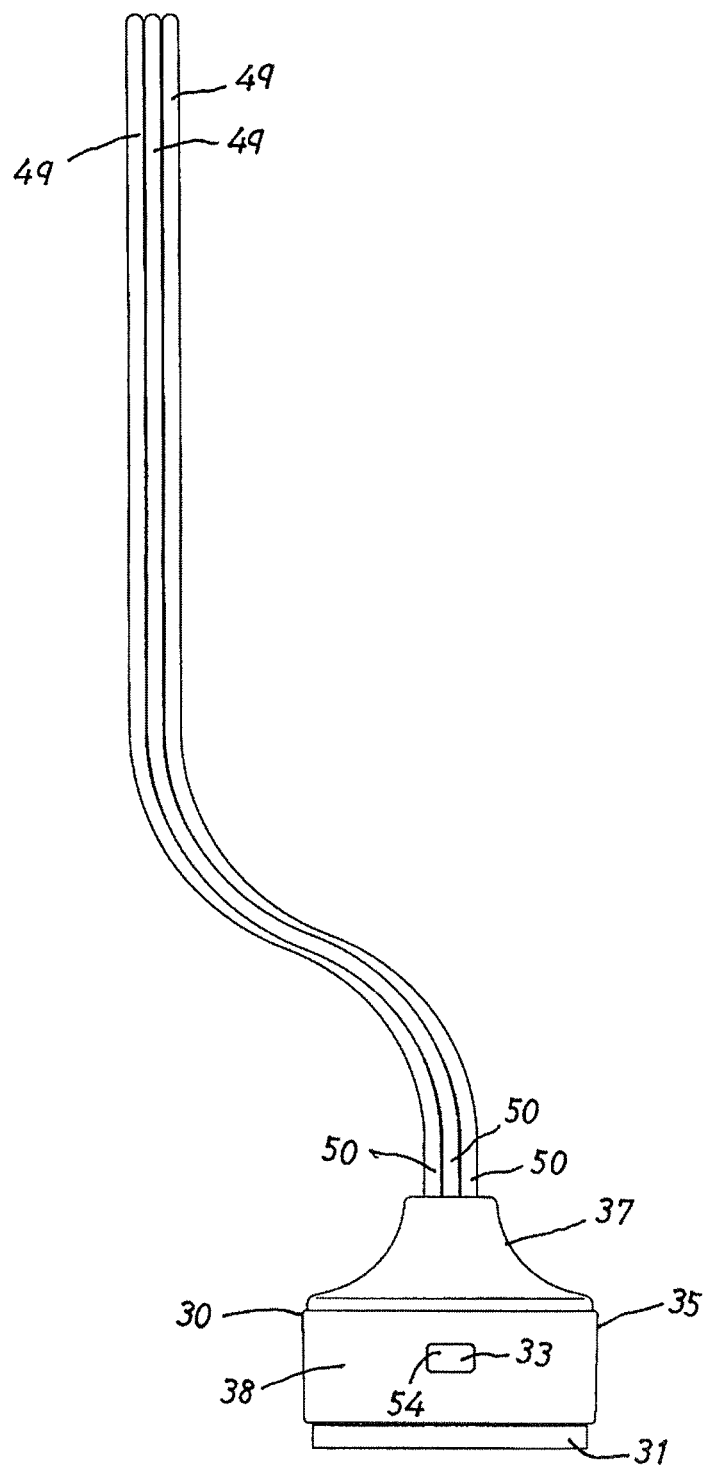
FIG. 11 front view of the second embodiment, serving as a suction cup device for a plastic bottle drying stand.

When this suction device 30 is used for a plastic bottle drying stand, it is fist necessary that the suction cup device 30 be attached to the attachment surface. FIG. 10 shows the state in which no pulling force is produced on the suction cup support shaft 32, which is the non-attached state. In this state, the suction cup 31 is placed on the attachment surface and the operation member 33 is moved to the left in the drawing, whereby a pulling force is produced on the suction cup support shaft 32, whereby the suction cup device 30 is attached to the attachment surface, which is the same as in the first embodiment. Furthermore, the method of releasing the attached state is also the same as in the first embodiment. When the operation member 33 is moved until the attached state is reached, the amount by which the larger end 53 of the operation member 33 protrudes from the housing 35 is zero. Furthermore, the amount by which the smaller end 54 protrudes is a positive value. Note that the three fixture members 49 are made from wire and serve as drying stands for inverted plastic bottles. The legs 50 of the fixture members 49 are inserted into the placement holes 40 in the top face 41, the insertion holes 43 in the cylindrical member 42, and the locking holes 46 in the retaining plate 44, before the suction cup device 30 is attached to the attachment surface. FIG. 11 shows the state in which the fixture members 49 have been inserted. However, the fixture members 49 cannot be used in the state shown in FIG. 11, but rather, beginning from this state, from among the three fixture members 49, the two fixture members 49 on either side of a central fixture member 49 are each rotated by 120° in opposite directions, so that the fixture members 49 will be spread out in three directions with angles of 120° therebetween. Then, plastic bottles are inverted and placed on the fixture members 49 via the mouths of the same, so as to dry the plastic bottles. A configuration wherein, instead of this, the fixture members 49 are inserted into the suction cup device 30 after the suction cup device 30 has been attached to the attachment surface is also possible.

Next, the sizes in the second embodiment will be described. The diameter of the housing 35 is approximately 64 mm, the height of the housing 35 including the cover 37 is approximately 50 mm, and the thickness of the suction cup 31 is approximately 6 mm. Accordingly, the overall height of the suction cup device 30 is approximately 56 mm. Furthermore, the length of the operation member 33 is approximately 69 mm. When the amount by which the larger end 53 of the operation member 33 protrudes is zero, in the attached state, the amount by which the smaller end protrudes is approximately 5 mm. Note that it is a matter of course that the present invention is not limited by the numerical values described above.

Note that the present invention can be embodied in various different modes based on the configuration described above. For example, a pot lid stand, a cutting board stand or the like can be produced by forming two frame-like parts from wire, and arranging these frame-like parts so to face each other with a gap therebetween, so that pot lids, cutting boards and the like can be arranged therein. Furthermore, a knife stand can be produced by providing the slit 26 in the retaining part 25 of the paper towel stand described above on the top face of the fixture member, so as to be able to insert the blade of a knife in this slit 26. Further, the fixture member may be permanently mounted on the suction cup device, or the fixture member may be detachable from the suction cup device so that replacement with other fixture members is possible. It is a matter of course that the fixture members are not limited to those made of wire.

Fixture members can be mounted on the top face of the suction cup device, and the suction cup device can be rapidly attached and released.

EXPLANATION OF THE SYMBOLS

1 suction cup device
2 suction cup
3 suction cup support shaft
4 coil spring
5 suction cup receptacle
6 operation member
7 support pin
8 housing
9 through hole
10 shaft hole
11 screw insertion hole
12 peripheral wall
13 insertion hole
14 side wall
15 inclined face
16 latching recess
17 peripheral wall
18 hole
19 screw post
20 fixture member
21 fastening post
22 leg
23 placement hole
24 support part
25 retaining part
26 slit
27 end
28 engagement part
29 end
30 suction cup device
31 suction cup
32 suction cup support shaft
33 operation member
34 support pin
35 housing
36 inclined face
37 cover
38 housing body
39 base
40 placement hole
41 top face
42 cylindrical member
43 insertion hole
44 retaining plate
45 screw insertion hole
46 locking hole
47 screw
48 screw hole
49 fixture member
50 arm
51 latching recess
52 insertion hole
53 end
54 end
55 hole
56 hole
57 part
58 part
59 insertion leg
60 bottom
61 shaft hole
62 fastening hole
63 fastening post
64 through hole
65 guide
66 bottom

The invention claimed is:

1. A suction cup device, comprising:
a suction cup;
a suction cup support shaft provided upright at a center position of a top face of the suction cup, the suction cup support shaft serving as a pull rod, the suction cup support shaft having a through hole toward one end, wherein the suction cup is attached to an attachment surface by applying a pulling force to the suction cup support shaft;
an operation member extending longitudinally between a first end and a second end and being configured to move longitudinally in a first longitudinal direction and in a second longitudinal direction opposite the first longitudinal direction;
a support pin extending through the through hole of the suction cup support shaft; and
a housing within which are located the suction cup support shaft, the operation member, and the support pin, the housing being open at one face where a bottom face of said suction cup is exposed; and
wherein the operation member has an insertion hole extending transversely through the operation member and spanning longitudinally along a partial length of the operation member, the suction cup support shaft extending through the insertion hole;
wherein the operation member, at a portion bordering the insertion hole, defines an it dined face along said partial length with the support pin positioned on said inclined face and said support pin being configured to slide either one of up or down said inclined face as said operation member moves longitudinally, said inclined face extending from a latching recess portion encompassing a longitudinal center of said operation member toward said second end;
wherein said operation member and support pin are configured so that movement of the operation member in the first longitudinal direction forces the support pin to move relatively up the inclined face thereby transmitting said pulling force to the suction cup support shaft and suction cup to pull said suction cup;
wherein said operation member has a first position at a first farthest end of movement in said first longitudinal direction where said support pin is at a bottom end of said inclined face;
wherein said operation member has a second position at a second farthest end of said movement in said second longitudinal direction where said support pin is at a second end of said inclined face having said latching recess portion;

wherein the housing has a first opening and a second opening aligned along each one of said first longitudinal direction and second longitudinal direction and receives, respectively, said first end and second end of said operation member, said operation member being of a length approximating a distance between said first opening and second opening;

wherein said inclined face is located along said operation member at a face position configured so when the operation member is at said second position said second end extends from said second opening by a second distance and said first end does not extend through said first opening; and wherein said fare position is further configured so when the operation member is at said first position said first end extends through said first opening by a first distance greater than said second distance and said second end is recessed relative to an outermost extent of said second opening by a third distance, said third distance being at least one-half longitudinal length from said first end of said inclined face to said bottom end.

2. The suction cup device of claim 1, wherein said face position is configured so when the operation member is at said second position said second end extends from said second opening by said second distance and said first end is flush with said first opening; and wherein said second distance is not greater than 5 mm and said first distance equals a longitudinal length of said inclined face less a diameter of said support pin.

3. The suction cup device recited in claim 1, wherein said inclined face serves as a cam mechanism that converts the longitudinal movement of the operation member into said pulling force that pulls said suction cup support shaft.

4. The suction cup device of claim 1, wherein said face position is configured so when the operation member is at said second position said second end extends from said second opening by said second distance and said first end is recessed relative to said first opening; and wherein said second distance is not greater than 5 mm and said first distance is greater than 5 mm.

5. The suction cup device of claim 1, wherein second distance is 2 mm and said first distance end is greater than 5 mm.

6. The suction cup device of claim 1, wherein said length of said operation member approximates within 3.5% a distance between an outermost extent of each one of said first opening and second opening.

* * * * *